United States Patent [19]

Mula, Jr.

[11] Patent Number: 5,986,429
[45] Date of Patent: Nov. 16, 1999

[54] BATTERY CHARGING SYSTEM FOR ELECTRIC VEHICLES

[76] Inventor: John Mula, Jr., 333 Lohonda Dr., Valpariso, Ind. 46383

[21] Appl. No.: 09/106,969

[22] Filed: Jun. 29, 1998

[51] Int. Cl.⁶ .............................. H02J 7/00; B60K 32/00; B62M 1/10
[52] U.S. Cl. ........................ 320/101; 180/165; 180/65.4; 280/212; 290/55
[58] Field of Search ............................ 320/101; 180/165, 180/65.3, 65.4; 280/212; 290/54, 55

[56] References Cited

U.S. PATENT DOCUMENTS

| | | | |
|---|---|---|---|
| 3,513,326 | 5/1970 | Potts | 290/55 |
| 4,179,007 | 12/1979 | Howe | 180/65 DD |
| 4,254,843 | 3/1981 | Han | 180/165 |
| 5,280,827 | 1/1994 | Taylor et al. | 180/165 |
| 5,296,746 | 3/1994 | Burkhardt | 290/55 |
| 5,680,032 | 10/1997 | Pena | 290/52 |

*Primary Examiner*—Peter S. Wong
*Assistant Examiner*—Gregory J. Toatley, Jr.
*Attorney, Agent, or Firm*—Goldstein & Canino

[57] ABSTRACT

A battery charging system for electric vehicles comprising a wind tunnel positioned longitudinally along the frame structure of an electric vehicle such that the overall transverse cross section of the vehicle is not increased, designed to minimize the drag effect associated with the wind tunnel. The wind tunnel includes an internal bore having a wide elliptical cross section, defining an air passageway through which air flows, as the vehicle travels in a forward direction. A plurality of wind driven generators are situated within the wind tunnel adapted to covert the stream of air therein to electric energy. The battery charging system further comprises regenerative braking system and solar panels for converting braking force and solar energy to produce electric energy.

4 Claims, 2 Drawing Sheets

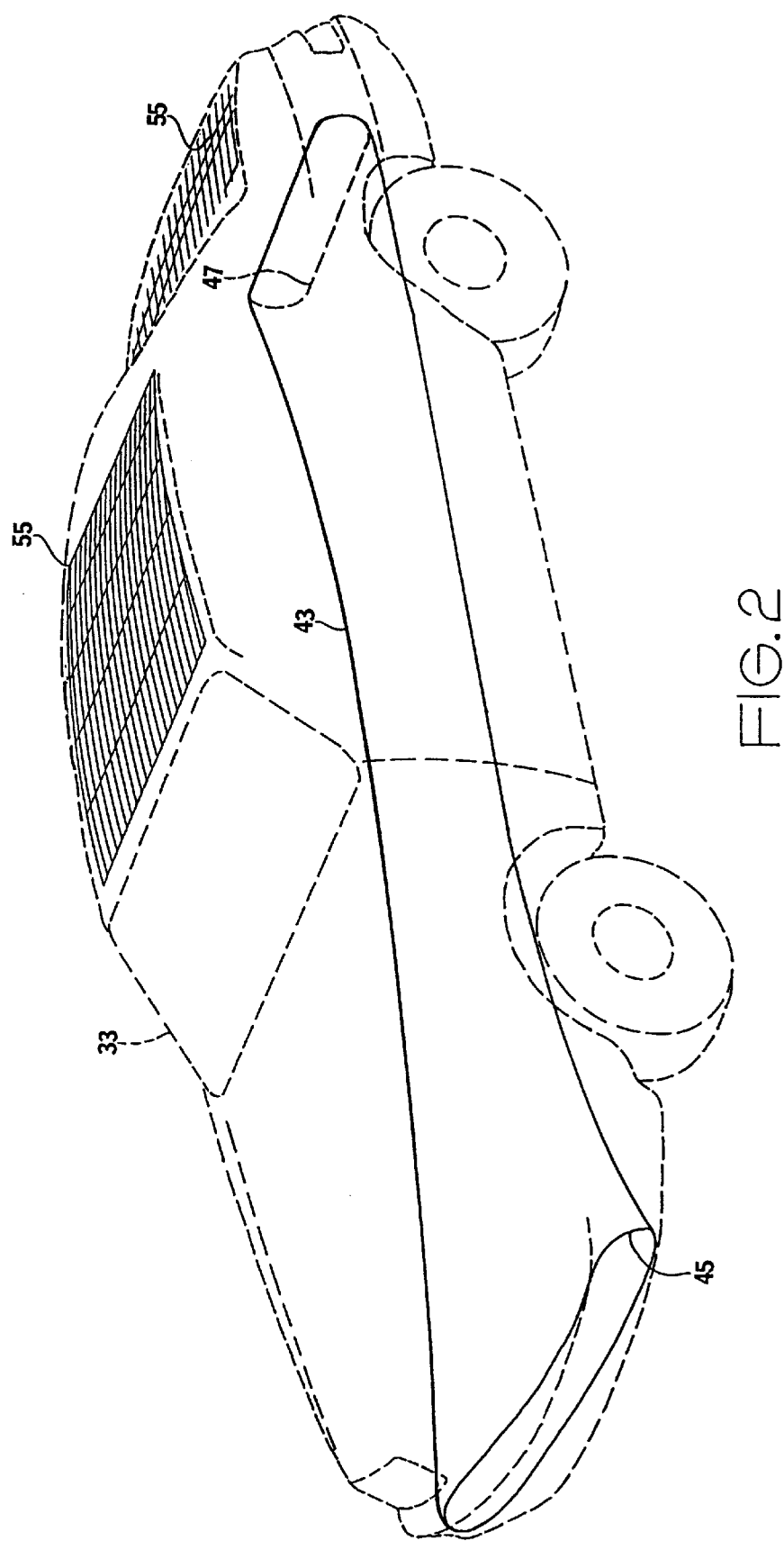

BATTERY CHARGING SYSTEM FOR ELECTRIC VEHICLES

BACKGROUND OF THE INVENTION

This invention relates to a battery charging system for electric vehicles. More particularly, the invention relates to a battery charging system which utilizes wind driven generators, solar panels, and a regenerative braking system, designed for charging the vehicle's battery while it is being driven so that the driving range thereof can be extended.

Varieties of electric powered vehicles have been proposed for passenger use, and have become increasingly popular with environmentalists due to their concern over petroleum scarcity and pollution. However, the existing electric vehicles suffer from a major disadvantage over fuel-consuming vehicles, in that the electric vehicles have limited driving range and require frequent recharging of their batteries. In an effort increase the driving range of electric powered vehicles, several references uncovered in the prior art provide electric vehicles utilizing wind driven generators to recharge their batteries. Such prior art devices are disclosed in U.S. Pat. Nos. 5,296,746, 4,254,843, 4,179,007, and 3,513,326. Most of the prior art devices employ bulky and awkwardly shaped wind driven generators that have high aerodynamic drag forces associated with them and can lead to a substantial expenditure of energy simply to overcome the aerodynamic drag.

Therefore, there is still a further need to provide an improved battery charging system for electric vehicles. Such a battery charging system should be capable of recharging the battery of an electrically powered vehicle while it is being driven, deriving its electric power from various sources such as the wind, sunlight, and regenerative braking, so that the driving range of the vehicle can be extended. Moreover, such a battery charging system should be capable of converting wind power to electric energy without sacrificing the vehicle's overall aerodynamic characteristics.

While these units mentioned above may be suitable for the particular purpose employed, or for general use, they would not be as suitable for the purposes of the present invention as disclosed hereafter.

SUMMARY OF THE INVENTION

It is an object of the invention to provide a battery charging system which is capable of recharging the battery of an electrically powered vehicle while it is being driven, deriving its electric power from various sources such as the wind, sunlight, and braking power, so that the driving range of the vehicle can be extended.

It is another object of the invention to provide a battery charging system employing a wind tunnel extending longitudinally from the front of an electric vehicle and terminating at the rear thereof, and a plurality of wind driven generators situated within the wind tunnel for converting the flow of air therein to electric power, as the vehicle moves in the forward direction.

It is yet another object of the invention to provide a wind tunnel built into an electric vehicle such that the vehicle's overall aerodynamic characteristics are not sacrificed.

The invention is a battery charging system for electric vehicles comprising a wind tunnel positioned longitudinally along the frame structure of an electric vehicle such that the overall transverse cross section of the vehicle is not increased, designed to minimize the drag effect associated with the wind tunnel. The wind tunnel includes an internal bore having a wide elliptical cross section, defining an air passageway through which air flows, as the vehicle travels in a forward direction. A plurality of wind driven generators are situated within the wind tunnel adapted to covert the stream of air therein to electric energy. The battery charging system further comprises regenerative braking system and solar panels for converting braking force and solar energy to produce electric energy.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 2 is a diagrammatic perspective view of a preferred embodiment of a wind tunnel of the battery charging system in accordance with the principles of the present invention.

DETAILED DESCRIPTION OF THE PREFERRED EMBODIMENTS

Figure 1:
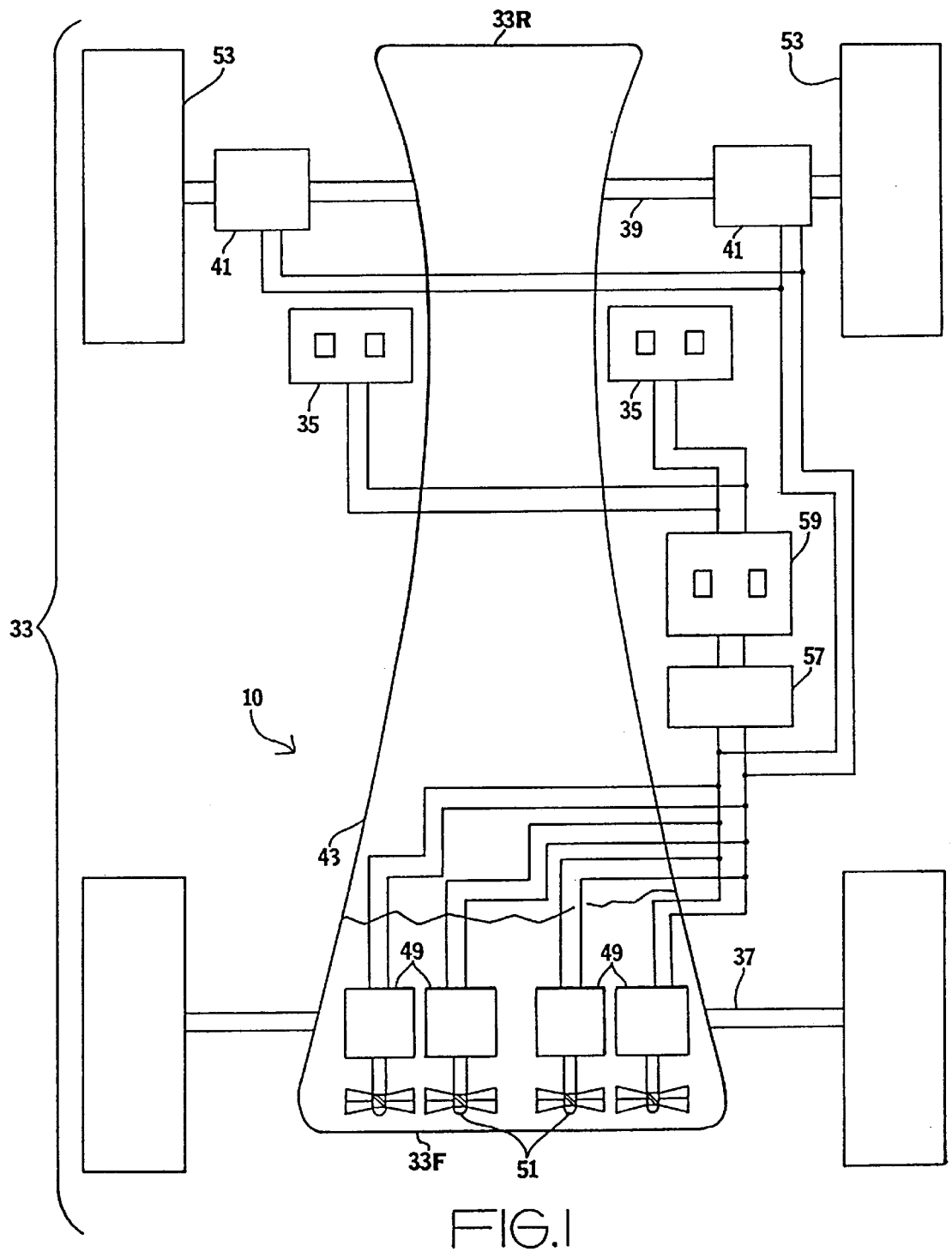
FIG. 1 is a top plan view of a battery charging system, with parts broken away, illustrating the major functional components of the invention.

FIG. 1 illustrates a preferred embodiment of a battery charging system 10 for electric vehicles in accordance with the principles of the present invention. As will be seen in the following paragraph, the battery charging system 10 of the present invention is designed to recharge its batteries from various sources, including electric energy converted from the wind, sunlight, and regenerative braking, so as to maximize the driving range of electric vehicles. For a better understanding of the present invention, a top plan view of an electric powered vehicle 33 is illustrated having opposite front 33F and rear 33R ends, at least one battery 35, front 37 and rear 39 axles, and two electric drive motors 41 coupled to the rear axle.

The battery charging system 10 of the present invention includes a wind tunnel 43 extending longitudinally along the frame structure of the vehicle between the front 33F and the rear 33R of the vehicle. FIG. 2 illustrates the wind tunnel 43 including front 45 and rear 47 openings, and an internal bore having an overall wide elliptical cross section, defining an air passageway through which air flows from the front opening 45 thereof and exiting at the rear opening 47, as the vehicle 33 travels in a forward direction. One aspect of importance in the present invention is the way the wind tunnel 43 is built into the vehicle such that the vehicle's overall aerodynamic design is not sacrificed. This may be achieved by fitting the wind tunnel 43 within the vehicle frame structure without increasing the overall transverse cross section of the vehicle. As seen by referring to FIG. 2, the wind tunnel 43 is positioned along the frame structure immediately above the front and rear axles to minimize the drag effect associated therewith.

Referring back to FIG. 1, a plurality of wind driven generators 49 are situated within the wind tunnel 43, adapted for converting the flow of air within the wind tunnel to electric power. Each of the wind driven generators include a propeller 51 rotatably mounted thereto to spin about a horizontal rotational axis. As the vehicle moves faster in the forward direction, the flow of air within the wind tunnel 43 becomes greater and the high velocity air streams causes the propellers 51 to rotate. The wind driven generators 49 also include a generator of any suitable type operatively coupled to the propeller 51 to convert the mechanical rotation to electrical energy.

Pursuant to the invention, the battery charging system 10 of the present invention includes a regenerative braking system for converting the vehicle kinetic energy to electric energy when braking is initiated. The rear wheels 53 of the electric vehicle are coupled to and powered by one or more electric motors 41 for driving the vehicle. The electric drive motors 41 may also be operated as a generator to effect regenerative braking so as to generate electric power. In this manner, when the brake pedal of the electric vehicle is actuated by the driver, the vehicle will decelerate according to the desire of the driver while recovering kinetic energy of the vehicle into electric power for the purpose of recharging the batteries.

In keeping with a further aspect of the invention, the battery charging system 10 also includes solar panels 55 secured to the roof and top of the trunk of the electric car 33 to collect solar energy and produce electric power whenever they are exposed to sunlight. There might be additional components necessary to condition the electric current from the wind driven generators 49, solar panels 55, and regenerative braking system 41, prior to charging of the battery, such as, for example, voltage regulator 57, and transformer 59. These components are well known to persons of ordinary skill in the art and its specific design or configuration forms no part of the discussion herein.

When constructed in accordance with the teachings of the present invention, the battery charging system of the present invention enables an electrically powered vehicle to travel further distance with its batteries fully charged. Many specific details contained in the above description merely illustrate some preferred embodiments and should not be construed as a limitation on the scope of the invention. Many other variations are possible.

What is claimed is:

1. A battery charging system for electric vehicles having a frame structure, and at least one battery, comprising:
   a) a wind tunnel extending longitudinally along said frame structure of the vehicle, said wind tunnel having an internal bore through which air flows as the vehicle travels in a forward direction, wherein the internal bore has an overall wide elliptical cross section; and
   b) a plurality of wind driven generators situated within said tunnel for converting flow of air therein to electric power; wherein
   c) the vehicle further has front and rear axles, and wherein the wind tunnel is positioned along the frame structure immediately above said front and rear axles to minimize the drag effect associated therewith.

2. The battery charging system as recited in claim 1, wherein the wind driven generators comprises a propeller rotatably mounted to spin about a horizontal rotation axis, and a generator operatively coupled to said propeller to covert mechanical rotational force to electric energy.

3. The battery charging system as recited in claim 2, further comprising a regenerative braking system for converting braking force to produce electric power.

4. The battery charging system as recited in claim 3, further comprising at least one solar panel secured to the vehicle for converting solar energy to produce electric power when exposed to sunlight.

* * * * *